United States Patent
Suzzoni et al.

(10) Patent No.: US 7,546,400 B2
(45) Date of Patent: Jun. 9, 2009

(54) DATA PACKET BUFFERING SYSTEM WITH AUTOMATIC THRESHOLD OPTIMIZATION

(75) Inventors: Jean-Pierre Suzzoni, Cagnes sur Mer (FR); Fabrice Gorzegno, Cagnes sur Mer (FR); Lionel Guenoun, Nice (FR); Denis Roman, La Turbie (FR)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/906,345

(22) Filed: Feb. 15, 2005

(65) Prior Publication Data
US 2005/0180250 A1    Aug. 18, 2005

(30) Foreign Application Priority Data
Feb. 13, 2004    (EP)    ................... 04368009

(51) Int. Cl.
*G06F 3/00* (2006.01)
*G06F 5/00* (2006.01)
*G06F 13/00* (2006.01)
*G06F 13/14* (2006.01)
*H04L 12/26* (2006.01)
*H04L 12/28* (2006.01)
*H04L 12/56* (2006.01)

(52) U.S. Cl. .............. 710/52; 710/29; 710/57; 710/100; 710/305; 370/252; 370/412

(58) Field of Classification Search ........... None
See application file for complete search history.

(56) References Cited

U.S. PATENT DOCUMENTS

| | | | | |
|---|---|---|---|---|
| 5,278,956 A | * | 1/1994 | Thomsen et al. | 711/167 |
| 5,455,913 A | * | 10/1995 | Shrock et al. | 710/100 |
| 5,546,389 A | * | 8/1996 | Wippenbeck et al. | 370/412 |
| 5,859,882 A | * | 1/1999 | Urbansky | 375/375 |
| 5,884,099 A | * | 3/1999 | Klingelhofer | 710/52 |
| 6,101,329 A | * | 8/2000 | Graef | 710/52 |
| 6,119,207 A | * | 9/2000 | Chee | 711/158 |
| 6,167,032 A | * | 12/2000 | Allison et al. | 370/252 |

(Continued)

FOREIGN PATENT DOCUMENTS

EP    764896 A1 *    3/1997

*Primary Examiner*—Tariq R. Hafiz
*Assistant Examiner*—Henry Yu
(74) *Attorney, Agent, or Firm*—Ira D. Blecker; Wenjie Li

(57) ABSTRACT

Data packet buffering system comprising a data buffer for buffering data packets, a first counter (24) preloaded with the data packet size (32) and decremented at each read clock signal of a number of logical units corresponding to the width of the output bus (18), a second counter (28) preloaded with the data packet size and decremented at each write clock signal of a number of logical units corresponding to the width of the input bus (14), the decrementation of the second counter being started at the same time as the decrementation of the first counter by a start counter signal (38), and a threshold unit (52) for determining the minimum threshold from the contents of the second counter when the first counter has reached zero and providing the minimum threshold to a buffer management logic unit a buffer management logic unit (22) providing write grant signals when data may be read from the data buffer and sent to an output device.

9 Claims, 3 Drawing Sheets

U.S. PATENT DOCUMENTS

| | | | |
|---|---|---|---|
| 6,233,629 B1 * | 5/2001 | Castellano | 710/29 |
| 6,389,489 B1 * | 5/2002 | Stone et al. | 710/57 |
| 6,578,102 B1 * | 6/2003 | Batchelor et al. | 710/310 |
| 6,678,777 B2 * | 1/2004 | Rao et al. | 710/305 |
| 6,687,255 B1 * | 2/2004 | Holm et al. | 370/412 |
| 6,715,007 B1 * | 3/2004 | Williams et al. | 710/52 |
| 6,907,481 B2 * | 6/2005 | Kovacevic | 710/60 |
| 6,950,887 B2 * | 9/2005 | Chapple et al. | 710/55 |
| 6,986,004 B1 * | 1/2006 | Cheng et al. | 711/149 |
| 7,298,808 B1 * | 11/2007 | Rey | 375/372 |
| 2003/0059065 A1 * | 3/2003 | Wildhagen et al. | 381/107 |
| 2003/0184678 A1 * | 10/2003 | Chen et al. | 348/511 |

\* cited by examiner

DATA PACKET BUFFERING SYSTEM WITH AUTOMATIC THRESHOLD OPTIMIZATION

TECHNICAL FIELD

The invention relates to the data buffering system wherein a data buffer is used for delaying the data packets received from an input device before providing them to an output device and relates in particular to a data packet buffering system with automatic threshold optimization.

BACKGROUND

In a data buffering system illustrated in FIG. 1, a dual port data buffer 10 such as a first in—first out (FIFO) interfaces an input device 12 by an input bus 14 and an output device 16 by an output bus 18. By monitoring the buffer write operations through the write control line and the write clock line and the buffer read operations through the read control line and the read clock line, a buffer occupancy monitoring unit 20 determines the occupancy of the buffer. Then, a buffer management logic unit 22 uses the buffer occupancy information provided by the buffer occupancy monitoring unit to grant data write or data read to output device 16 respectively.

When data write is granted, the data are written into the data buffer by means of elementary transfers cadenced by the write clock, each transfer carrying an amount of data referred to the input logical unit corresponding generally to an integer number of bytes and equal to the input bus width.

Likewise, when data read is granted, the data are read from the data buffer 10 by means of elementary transfers cadenced by the read clock, each transfer carrying an output logical unit corresponding generally to an integer number of bytes equal to the output bus width.

In many applications, especially in telecom systems, the data following through the data buffer is often packetized and consists in fixed length data packets. Unless the input and output devices have their own buffering area for packet re-assembly and disassembly, the buffer is accessed by writing and/or reading in a row insofar as many logical units are needed to transfer an entire packet.

As the transfer of a packet cannot be interrupted once started, this implies for the buffer management logic unit 22 to implement a protection against buffer overrun by de-granting packet write when the amount of free room available in the data buffer becomes lower that needed to store a number of entire packets that depends on the input device latency to grant, and to implement a protection against buffer underrun by granting packet read when enough data are available in the data buffer, this allowing to read an entire packet without facing a buffer empty condition when the read clock is faster than the write clock.

As far as underrun is concerned, the most common protection technique consists in asserting read grant whenever the contents of the data buffer are equal or higher than one entire packet. Whenever the data latency in the buffer needs to be minimized, a "cuthrough" mechanism is implemented. It grants reading when the minimum amount of data, safe against underrun, resides in the buffer and therefore allows to start reading while buffer contains less than an entire packet. This is generally achieved by asserting a read grant whenever the buffer contents are higher than a predetermined threshold which is either hardware or provided to the buffer management logic by means of a configuration register. Unfortunately, the determination of a threshold value requires an exact knowledge of the read and write frequencies prior to hardwire it or to configure the buffer parameters, which is rarely the case in view of the possible frequency fluctuations.

SUMMARY OF THE INVENTION

Accordingly, the object of the invention is to provide a data buffering system comprising means for automatically determining the optimum threshold which enables an underrun free operation regardless of the write and read frequencies being used.

The invention therefore relates to a data packet buffering system comprising a data buffer for buffering data packets received from an input device on an input bus and providing data packets to an output device on an output bus, a buffer occupancy monitoring unit for monitoring the buffer occupancy determined by the analysis of the write clock signals from the input device and the read clock signals from the output device, a buffer management logic unit providing write grant signals to the input device when data may be read from the data buffer and sent to the output device, and a threshold determining unit providing the minimum threshold of the buffer occupancy, the read grant signals being determined by comparison between the real buffer occupancy and the threshold. The threshold determining unit comprises a first counter preloaded with the data packet size and decremented at each read clock signal of a number of logical units corresponding to the width of the output bus, a second counter preloaded with the data packet size and decremented at each write clock signal of a number of logical units corresponding to the width of the input bus, the decrementation of the second counter being started at the same time as the decrementation of the first counter by a start counter signal (38), and a threshold unit for determining the minimum threshold from the contents of the second counter when the first counter has reached zero and providing the minimum threshold to the buffer management logic unit.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
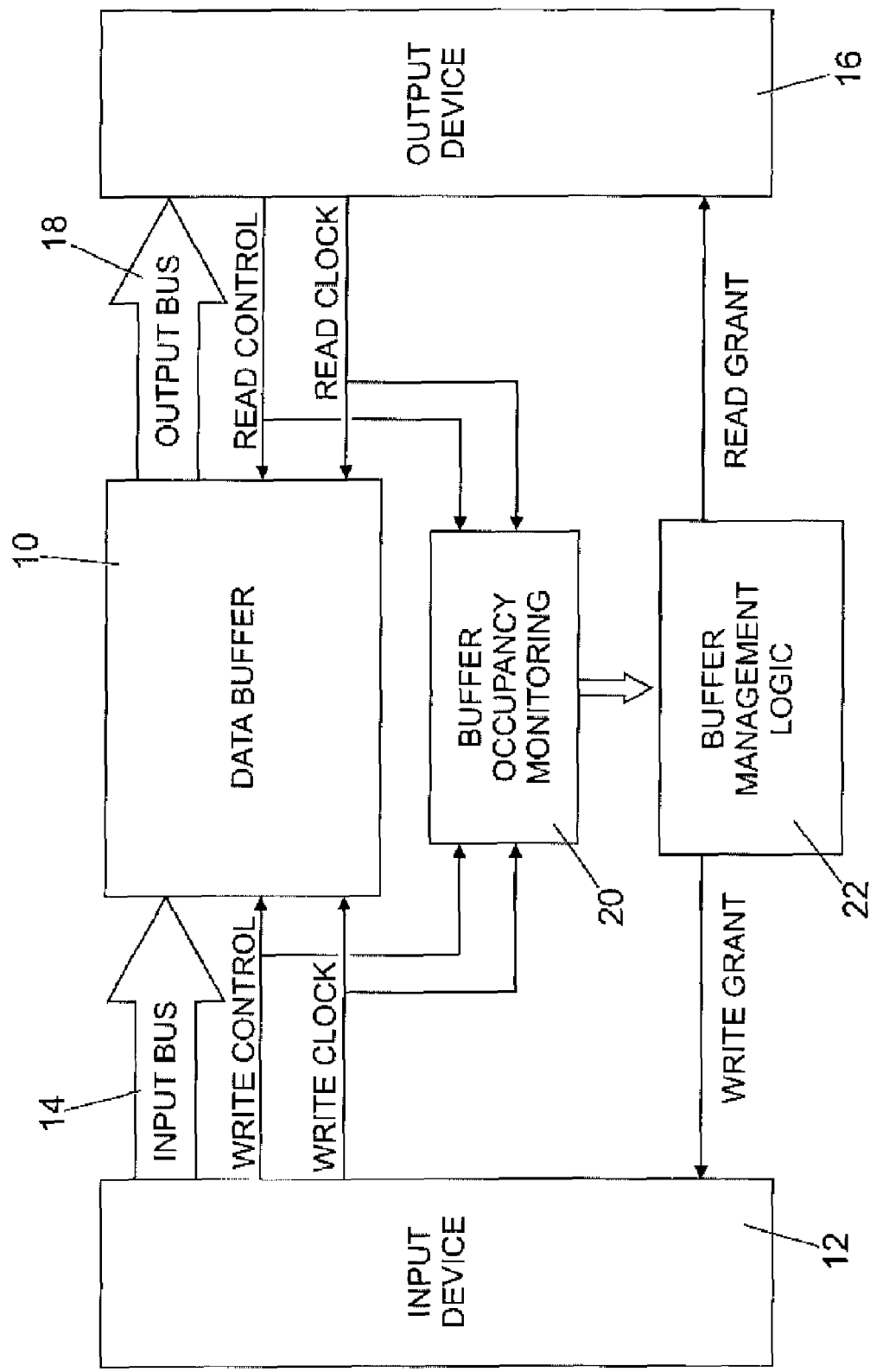
FIG. 1 is a block diagram representing a data buffering system implementing the invention.

The principles of the invention are implemented in a data buffering system such as the one illustrated in FIG. 1 wherein a data buffer 10 receives packets from an input device 12. The occupancy of the data buffer 10 is monitored by the buffer occupancy monitoring unit 20 and managed by the buffer management logic unit 22.

Figure 2:
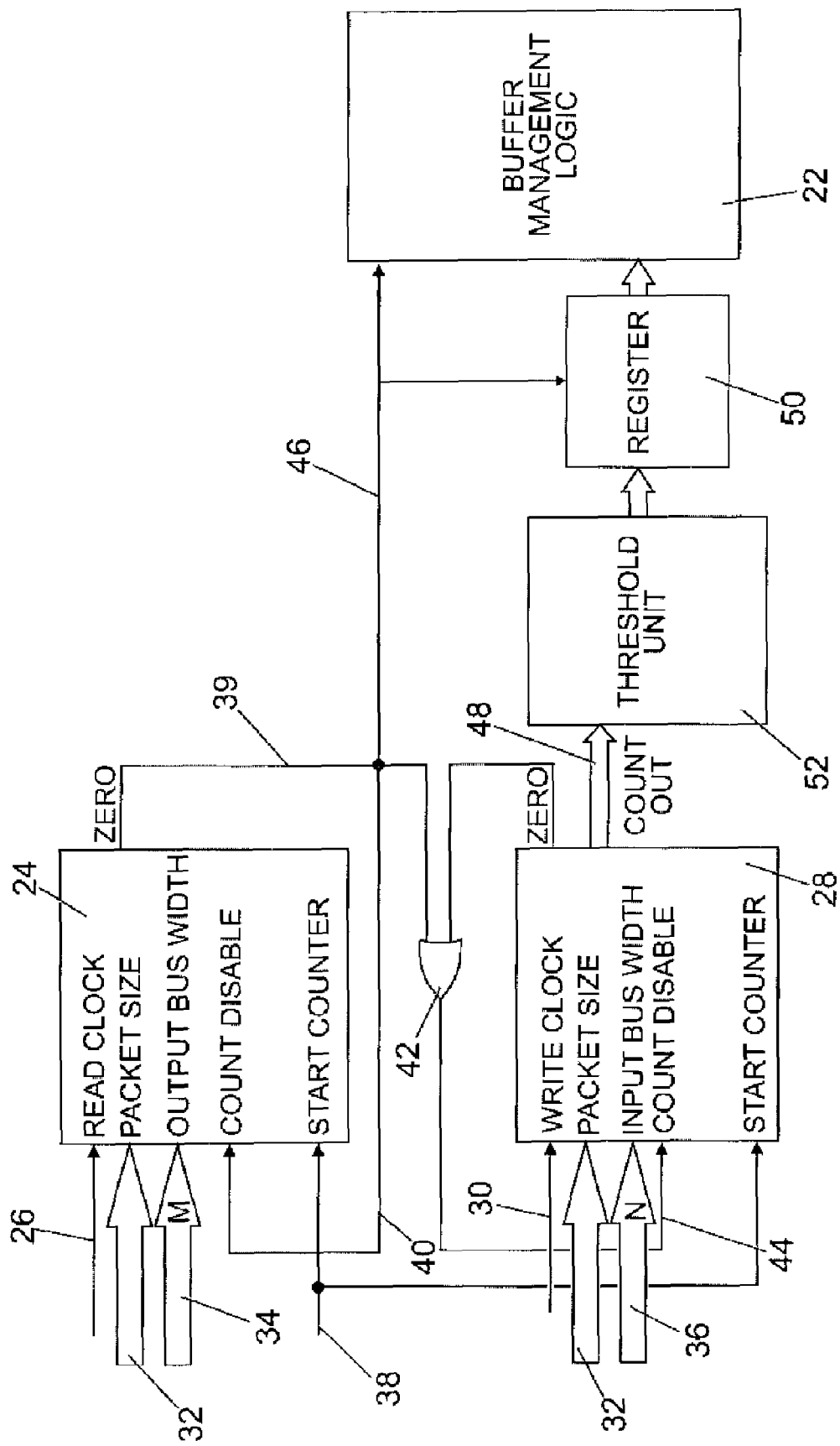
FIG. 2 is a device according to the principles of the invention enabling to determine the optimum threshold to be used for avoiding an underrun free operation.

According to the invention, the buffer management logic unit 22 controls the write grant and the read grant by means of an optimum threshold provided by a threshold determining device represented in FIG. 2.

Such a threshold determining device includes a down counter 24 which is clocked by the read clock 26 and a down counter 28 which is clocked by the write clock 30. The two counters are first preloaded by the packet size 32 which corresponds to the number of logical units in a packet that are generally data bytes. Another parameter provided by the counters is the width M of the output bus provided by the down counter 24 at its input 34 whereas the width N of the input bus is provided to the counter 28 at its input 36, the numbers M and N being the number of logical units transported respectively by each bus.

After the two counters have been preloaded and have received the width of the corresponding bus, a starting signal is provided on line 38 for starting the two down counters to be decremented. Counter 24 is decremented by M logical units at each pulse of the read clock 26 whereas counter 28 is decremented by N logical units at each pulse of the write clock 30.

When counter 24 reaches 0, the zero output signal on line 39 is sent to the count disable input 40 of counter 24 and via an OR circuit 42, is also sent to the count disable input 44 of counter 28. When counter 28 reaches 0, a count disable signal is sent via OR circuit 42, to the count disable input 44 of counter 28 only.

When the down counter 24 reaches 0, the zero signal is also sent on line 46 to load a register 50 with the contents of down counter 28 provided at its output 48 or a number obtained after processing by a threshold unit 52 as described later. If the decrementation of counter 24 is faster than the decrementation of counter 28, the remaining contents of the latter is different from zero when the zero signal is provided to the count disable input 44 of counter 28. If the decrementation of counter 28 is faster than the decrementation of counter 24, the counter 28 has already reached zero when the zero signal provided by counter 24 is provided to the count disable input 44 of counter 28. The zero signal sent on line 46 is also used to enable the contents of register 50 to be provided to the buffer management logic unit 22 which uses them for asserting grant or not in order to implement a protection against buffer underrun or overrun as already explained.

It must be noted that the width N of the input bus is generally the same as the width of the output bus M. In such a case, it is not necessary to provide the input M to counter 24 and the input N to counter 28 since the amount of data being decremented is the same in the two counters. Also, the only parameters being taken into considerations are the read and write clock frequencies. If the read clock frequency is higher that the write clock frequency, the count at the output of counter 28 when counter 24 reaches 0 is different from zero whereas this count is zero if the read clock frequency is less than the write clock frequency.

Figure 3A:
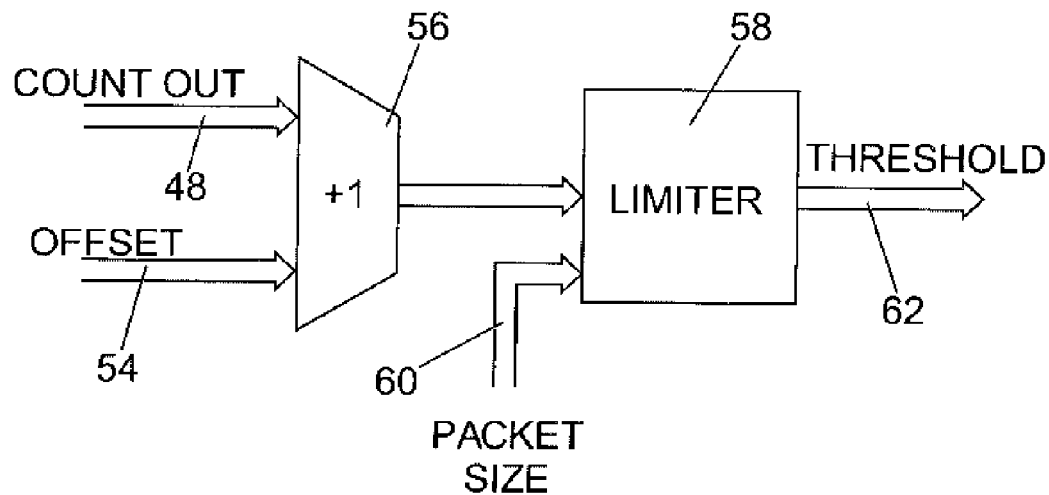
FIG. 3A is a first embodiment of the threshold unit used in the device illustrated in FIG. 2.

A first embodiment of the threshold unit is represented in FIG. 3A. In this implementation, the count out provided by counter 28 is added to an offset 54 in an adder 56. The offset is a predetermined value depending on the implementation of the system enabling to take into consideration the latency of the read grant signal (see FIG. 1) to be transmitted to the buffer management logic unit 22 after receiving the threshold to the output device. Indeed, if the latency is such that n logical units can be read from the data buffer during this latency, it is necessary that the data buffer contains more than n logical units when a read de-granting signal is issued by the buffer management logic unit in order to perform read attempts while the buffer is empty. Such contents corresponding to the read grant latency is the offset 54 to be applied.

The adder 56 also adds +1 to the sum of the count out 48 and offset 54. Indeed, when the write clock frequency is higher than the read clock frequency, the count out issued by counter 28 is zero. Therefore, it would not be possible to read the data buffer if a zero threshold is applied. It is necessary to add +1 in order to have always one logical unit in the data buffer before reading it. Moreover, adding +1 is necessary in order to avoid reading an empty buffer due to an asynchronism of the write and read clocks when the frequency of the read clock is equal to or slightly higher than the frequency of the write clock.

Then, the output of the adder 56 is provided to a limiter 58. The other input of limiter 58 is the packet size 60. The limiter is necessary when the read clock frequency is higher than the write clock frequency since, in such a case, the count out from counter 28 could be higher than a packet size resulting in a packet being never read until a new packet is stored in the buffer.

Therefore, the threshold at the output 62 of the limiter is limited to the packet size enabling the buffer management logic unit 22 to provide a read grant anyway as soon as an entire packet is held in the data buffer.

Figure 3B:
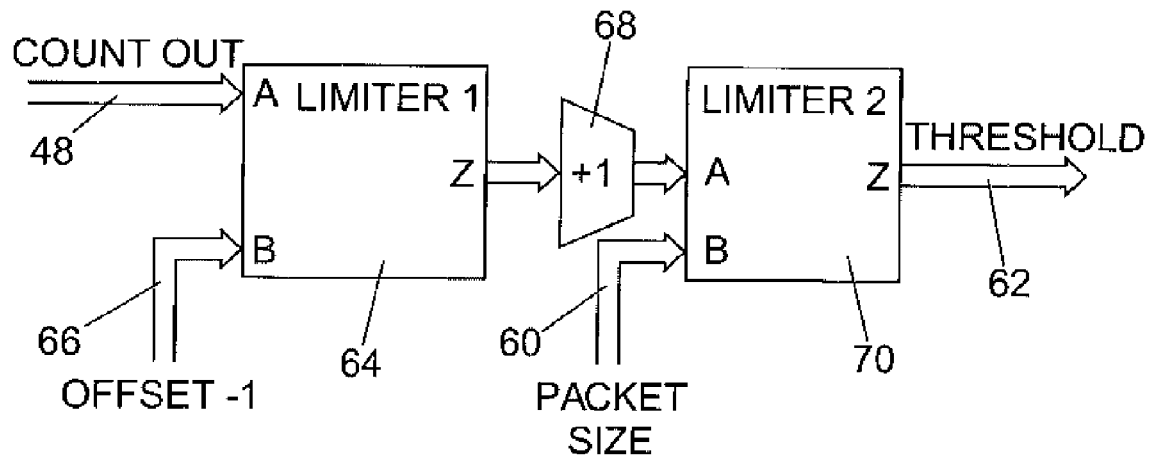
FIG. 3B is a second embodiment of the threshold unit enabling to improve the threshold optimization.

A second embodiment of the threshold unit 52 is represented in FIG. 3B. As it was already mentioned, the offset is required when the theorical threshold obtained at the output of counter 28 is less than the offset value in order to compensate the read grant latency. But this offset is not necessary when the theorical threshold is higher than the offset. Accordingly, the device illustrated in FIG. 3B achieves a clamping function rather than an adding function.

As illustrated, a first limiter 64 receives as input A the count out 48 issued by counter 28 and the offset −1 66 as input B. Its output Z depends on the values A and B as follows $Z = A$ if $A > B$ $Z = B$ if $A \leq B$ Then, +1 is added to the output of limiter 64 by an adder 68, the output of which is the input A of a second limiter 70 which receives the packet size 60 as second input B as previously. The output Z of limiter 70 which provides the threshold 62 to be used depends on the values A and B as follows $Z = B$ if $A > B$ $Z = A$ if $A \leq B$ It must be noted that the addition of +1 is always necessary to avoid the problem raised by the asynchronism of the write and read clock as already mentioned.

The device which is described above enables to provide an optimized threshold in any case. Indeed, if the write clock frequency is higher than the read clock frequency, the theorical threshold being zero, the real value to be used is equal to the offset (or to the offset +1 in the first embodiment of FIG. 3A). The data buffer being written faster than it is read, it is obvious that a packet read can start as soon as one logical unit is written into the buffer.

If the read clock frequency is higher than the write clock frequency, the theorical threshold provided by counter 28 represents the number of logical units that would have missed in the buffer if a packet write and a packet read have been started simultaneously with a possible error of −1 due to the clock asynchronism. The use of a limiter to the packet size avoids from having the theoretical threshold higher than the packet size resulting in a packet being never read until a new packet is received as explained above.

In summary, the implementation of the invention minimizes the data latency in the data buffer, reduces the average buffer occupancy and therefore minimizes the buffer full condition occurrence, especially when a small size buffer is used. As a consequence, corresponding input flow control occurrence is also reduced, which results in an improved throughput.

It must be noted that the threshold determining device can either be run once at system startup after the read and write clocks are stabilized or run periodically. In the latter case, comparing results between runs may enable to detect relative frequency drift of read and write clocks.

What is claimed is:

1. Data packet buffering system comprising a data buffer for buffering data packets received from an input device on an input bus and providing data packets to an output device on an output bus, a buffer occupancy monitoring unit for monitoring a buffer occupancy determined by the analysis of write clock signals from said input device and read clock signals from said output device, a buffer management logic unit providing write grant signals to said input device when data may be read from said data buffer and sent to said output device, and a threshold determining unit providing a minimum threshold of the buffer occupancy, read grant signals being determined by comparison between a real buffer occupancy and said minimum threshold; said system being characterized in that said threshold determining unit comprises:
    a first counter preloaded with a data packet size and decremented at each read clock signal of a number of logical units corresponding to a width of said output bus,
    a second counter preloaded with the data packet size and decremented at each write clock signal of a number of logical units corresponding to a width of said input bus, the decrementation of said second counter being started at the same time as the decrementation of said first counter by a start counter signal, and
    a threshold unit for determining said minimum threshold from contents of said second counter when said first counter has reached zero and providing said minimum threshold to said buffer management logic unit, wherein the decrementation of said first counter and said second counter is stopped when the contents of said first counter reach zero, the count out reached by said second counter at this time being used as a theoretical threshold by said threshold unit for determining said minimum threshold.

2. The system according to claim 1, wherein the decrementation of said second counter is stopped when the contents of said second counter reach zero, said count out to be used by said threshold unit being zero.

3. The system according to claim 2, wherein said threshold unit includes an adder adding one logical unit to said count out so that, in any case, said data buffer always contains at least one logical unit.

4. The system according to claim 3, wherein an offset is added by said adder to said count out, said offset being a predetermined value corresponding to the latency of the read grant signals provided by said buffer management logic unit to said output device.

5. The system according to claim 4, wherein said threshold unit includes a limiter for limiting the value of said minimum threshold to the packet size when the output value of said adder is higher than said packet size.

6. The system according to claim 3, wherein said threshold unit includes a first limiter providing an output which is the value of said count out when this one is higher than an offset −1 in which said offset is a predetermined value corresponding to the latency of the read grant signals provided by said buffer management logic unit to said output device or the value of said offset −1 when the latter is higher than or equal to band count out, and a second limiter providing an output which is the output value of said adder when this value is less than or equal to the packet size or said packet size when said adder output value is higher than said packet size.

7. Data packet buffering system comprising a data buffer for buffering data packets received from an input device on an input bus and providing data packets to an output device on an output bus, a buffer occupancy monitoring unit for monitoring a buffer occupancy determined by the analysis of write clock signals from said input device and read clock signals from said output device, a buffer management logic unit providing write grant signals to said input device when data may be read from said data buffer and sent to said output device, a threshold determining unit providing a minimum threshold of the buffer occupancy, read grant signals being determined by comparison between a real buffer occupancy and said minimum threshold, said threshold determining unit comprising:
    a first counter preloaded with a data packet size and decremented at each read clock signal of a number of logical units corresponding to a width of said output bus,
    a second counter preloaded with the data packet size and decremented at each write clock signal of a number of logical units corresponding to a width of said input bus, the decrementation of said second counter being started at the same time as the decrementation of said first counter by a start counter signal, and
    a threshold unit for determining said minimum threshold from contents of said second counter when said first counter has reached zero and providing said minimum threshold to said buffer management logic unit; and
    a register for storing the value provided by said threshold unit when the contents of said first counter reach zero.

8. The system according to claim 7, wherein the contents of said register are provided to said buffer management logic unit when the contents of said first counter reach zero.

9. Data packet buffering system comprising a data buffer for buffering data packets received from an input device on an input bus and providing data packets to an output device on an output bus, a buffer occupancy monitoring unit for monitoring a buffer occupancy determined by the analysis of write clock signals from said input device and read clock signals from said output device, a buffer management logic unit providing write grant signals to said input device when data may be read from said data buffer and sent to said output device, and a threshold determining unit providing a minimum threshold of the buffer occupancy, read grant signals being determined by comparison between a real buffer occupancy and said minimum threshold, said system being characterized in that said threshold determining unit comprises:
    a first counter preloaded with a data packet size and decremented at each read clock signal of a number of logical units corresponding to a width of said output bus,
    a second counter preloaded with the data packet size and decremented at each write clock signal of a number of logical units corresponding to a width of said input bus, the decrementation of said second counter being staffed at the same time as the decrementation of said first counter by a start counter signal, and
    a threshold unit for determining said minimum threshold from contents of said second counter when said first counter has reached zero and providing said minimum threshold to said buffer management logic unit;
    wherein said input bus and said output bus have the same width, so that the decrementation of said first counter and said second counter is of the same value at each write or read clock pulse.

* * * * *